United States Patent
Aramaki et al.

(10) Patent No.: US 11,706,364 B2
(45) Date of Patent: Jul. 18, 2023

(54) SIGNAL PROCESSING DEVICE

(71) Applicant: Mitsubishi Electric Corporation, Tokyo (JP)

(72) Inventors: Toru Aramaki, Tokyo (JP); Masako Asamura, Tokyo (JP); Miki Sugano, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 17/791,213

(22) PCT Filed: Jan. 8, 2021

(86) PCT No.: PCT/JP2021/000512
§ 371 (c)(1),
(2) Date: Jul. 7, 2022

(87) PCT Pub. No.: WO2021/145286
PCT Pub. Date: Jul. 22, 2021

(65) Prior Publication Data
US 2023/0037063 A1    Feb. 2, 2023

(30) Foreign Application Priority Data
Jan. 14, 2020    (JP) ................... 2020-003749

(51) Int. Cl.
*H04N 1/387*    (2006.01)
*H04N 1/00*    (2006.01)

(52) U.S. Cl.
CPC ..... *H04N 1/00816* (2013.01); *H04N 1/00803* (2013.01)

(58) Field of Classification Search
None
See application file for complete search history.

(56) References Cited

U.S. PATENT DOCUMENTS

| 6,155,605 A * | 12/2000 | Bratchley | G07D 7/1205 |
| | | | 283/57 |
| 2014/0376813 A1* | 12/2014 | Hongu | H04N 23/611 |
| | | | 382/118 |

(Continued)

FOREIGN PATENT DOCUMENTS

| EP | 3598400 A1 | 1/2020 |
| JP | 2005-10968 A | 1/2005 |

(Continued)

OTHER PUBLICATIONS

International Search Report and Written Opinion dated Mar. 30, 2021, received for PCT Application PCT/JP2021/000512, filed on Jan. 8, 2021, 19 pages including English Translation.

(Continued)

*Primary Examiner* — Dung D Tran
(74) *Attorney, Agent, or Firm* — Xsensus LLP

(57) ABSTRACT

A signal processing device (10) uses first characteristic data detected from a sheet-like detection target by a first detection element (1) and second characteristic data detected from the detection target by a second detection element (2) and having (i) a characteristic that is different from a characteristic of the first characteristic data and (ii) a correlation with the first characteristic data. The signal processing device (10) includes an evaluation value generator (3) that generates, by using the correlation with the second characteristic data, an evaluation value determining whether the first characteristic data includes an unnecessary portion, and a correction amount determiner (4) that determines, by using the evaluation value, for correction of data determined by the evaluation value generator (3) to be the unnecessary portion, a correction amount for the first characteristic data.

15 Claims, 5 Drawing Sheets

(56) References Cited

U.S. PATENT DOCUMENTS

| | | | |
|---|---|---|---|
| 2015/0287260 A1 | 10/2015 | Toyoda et al. | |
| 2015/0304511 A1 | 10/2015 | Morimoto et al. | |
| 2017/0187896 A1 | 6/2017 | Ogomi et al. | |
| 2018/0370745 A1* | 12/2018 | Yanagiuchi | G07D 7/00 |
| 2019/0088065 A1* | 3/2019 | Kagano | H04N 1/00795 |
| 2019/0139349 A1 | 5/2019 | Kagano et al. | |
| 2020/0358918 A1 | 11/2020 | Ogomi et al. | |

FOREIGN PATENT DOCUMENTS

| | | |
|---|---|---|
| JP | 2013-150708 A | 8/2013 |
| JP | 2013-182281 A | 9/2013 |
| JP | 2018-92655 A | 6/2018 |
| JP | 2018-169881 A | 11/2018 |
| JP | 2019-200802 A | 11/2019 |
| WO | 2014/077276 A1 | 5/2014 |
| WO | 2014/163148 A1 | 10/2014 |
| WO | 2015/147045 A1 | 10/2015 |
| WO | 2016/052613 A1 | 4/2016 |
| WO | 2018/168645 A1 | 9/2018 |
| WO | 2019/202715 A1 | 10/2019 |

OTHER PUBLICATIONS

Notice of Reasons for Refusal dated Jun. 7, 2022, received for JP Application 2021-571173, 19 pages including English Translation.

* cited by examiner

SIGNAL PROCESSING DEVICE

CROSS-REFERENCE TO RELATED APPLICATIONS

The present application is based on PCT filing PCT/JP2021/000512, filed Jan. 8, 2021, which claims priority to JP 2020-003749, filed Jan. 14, 2020, the entire contents of each are incorporated herein by reference.

TECHNICAL FIELD

The present disclosure relates to a signal processing device that uses one characteristic data detected from a sheet-like detection target and other characteristic data detected from the sheet-like detection target and having a characteristic that is different from a characteristic of the one characteristic data.

BACKGROUND ART

Some conventional signal processing devices process, for a sheet-like detection target that is a document such as a banknote and a securities certificate, multiple pieces of data that have mutually different characteristics (refer to, for example, Patent Literatures 1-5). Patent Literature 1 discloses three sensors that detect mutually different characteristics from a sheet-like detection target. Specifically, a thickness detection sensor that detects a thickness of the detection target, an optical line sensor that acquires an optical image of the detection target, and a magnetic line sensor that acquires a magnetic image of the detection target, are disclosed. Patent Literature 2 discloses performing image recognition in a manner in which data acquired by an optical line sensor and data acquired by a magnetic line sensor are mutually complementary.

Patent Literature 3 and Patent Literature 4 disclose acquiring data of an optical image and a magnetic image while overlapping (i) a reading area at a position for optical image reading and (ii) a reading area at a position for magnetic reading, thereby reading information of a positional relationship between the optical image and the magnetic image. Patent Literature 5 discloses a capacitance detection sensor that detects a change in capacitance of a detection target and an optical line sensor that acquires an optical image of the detection target. Detecting the change in capacitance of the detection target enables detecting a thickness of the detection target. The capacitance detection sensor and the aforementioned thickness detection sensor are sometimes used in order to detect a foreign object, such as cellophane tape, on the sheet-like detection target.

On the other hand, some conventional magnetic line sensors perform signal processing with respect to signal components that are obtained from a detection target by sequential detection, by a detection element, from the detection target (refer to, for example, Patent Literature 6, Patent Literature 7, and Patent Literature 8). Patent Literature 6 discloses a sensor that reads a printed image or a magnetic pattern due to a magnetic ink (i) without placing a constraint on timing of detection and (ii) without being affected by a change in sensor characteristics due to aging or an environmental change.

Patent Literature 7 discloses a sensor that can reduce the effect of the level fluctuation of a sensing signal that is generated within an interval for reading a detection target.

Patent Literature 8 discloses a sensor that suppresses variation of an output signal level due to the environmental change or aging.

CITATION LIST

Patent Literature

Patent Literature 1: International Publication No. WO 2018/168645
Patent Literature 2: International Publication No. WO 2019/202715
Patent Literature 3: International Publication No. WO 2014/163148
Patent Literature 4: International Publication No. WO 2016/52613
Patent Literature 5: Unexamined Japanese Patent Application Publication No. 2018-92655
Patent Literature 6: Unexamined Japanese Patent Application Publication No. 2013-182281
Patent Literature 7: International Publication No. WO 2014/77276
Patent Literature 8: International Publication No. WO 2015/147045

SUMMARY OF INVENTION

Technical Problem

The conventional signal processing devices, however, have a problem in that there is no consideration for the case in which an unnecessary portion is included in at least one of (i) one characteristic data detected from a sheet-like detection target or (ii) other characteristic data detected from the sheet-like detection target and having a characteristic that is different from a characteristic of the one characteristic data.

The present disclosure is made to solve the aforementioned problems and relates to a signal processing device that can address the case in which the unnecessary portion is included in at least one of (i) the one characteristic data detected from the sheet-like detection target or (ii) the other characteristic data detected from the sheet-like detection target and having a characteristic that is different from a characteristic of the one characteristic data.

Solution to Problem

A signal processing device according to the present disclosure is a signal processing device that uses first characteristic data detected from a sheet-like detection target by a first detection element and second characteristic data detected from the detection target by a second detection element and having (i) a characteristic that is different from a characteristic of the first characteristic data and (ii) a correlation with the first characteristic data. The signal processing device includes (i) an evaluation value generator that generates, by using the correlation of the first characteristic data with the second characteristic data, an evaluation value determining whether the first characteristic data includes an unnecessary portion, and (ii) a correction amount determiner that determines, by using the evaluation value, for correction of data determined by the evaluation value generator to be the unnecessary portion, a correction amount for the first characteristic data.

Advantageous Effects of Invention

As described above, according to the present disclosure, a signal processing device that enables easy correction of the unnecessary portion of characteristic data is obtainable.

DESCRIPTION OF EMBODIMENTS

Embodiment 1

Figure 1:
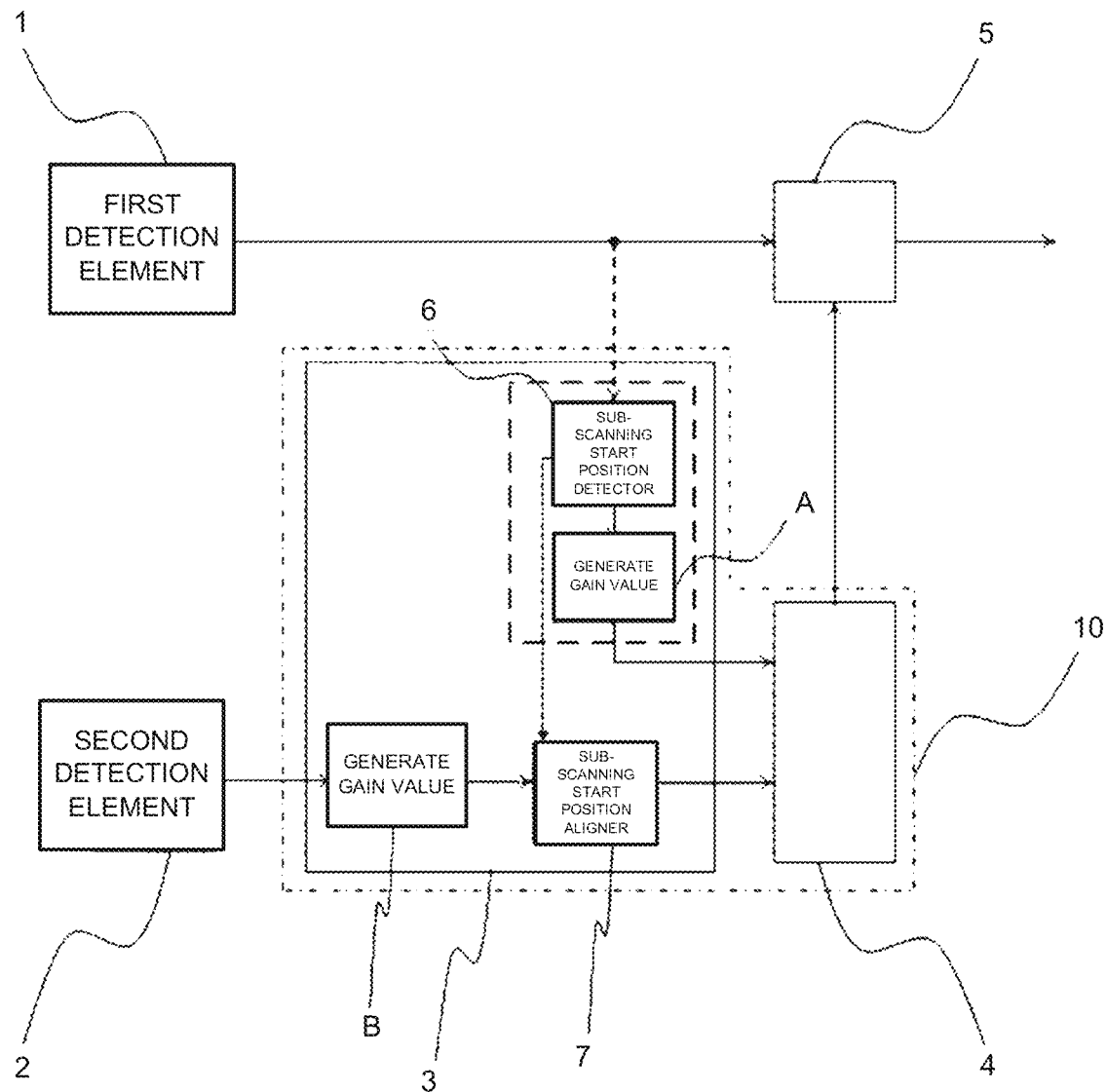
FIG. 1 is a functional block diagram of a signal processing device according to Embodiment 1.
Figure 2:
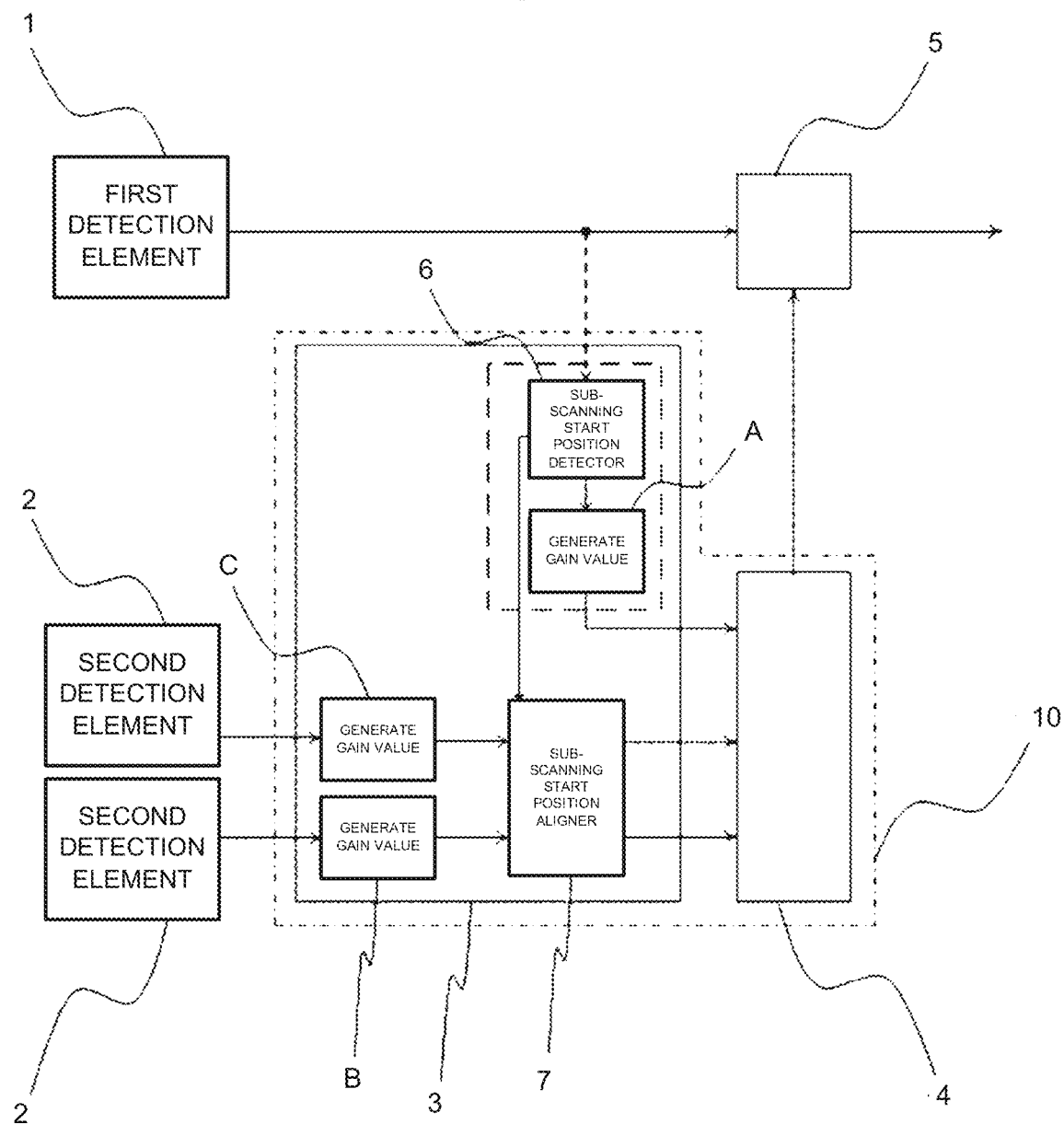
FIG. 2 is a functional block diagram of another signal processing device according to Embodiment 1.

Hereinafter, a signal processing device 10 that is a signal processing device according to Embodiment 1 is described with reference to FIGS. 1 and 2. The signal processing device 10 at least includes an evaluation value generator 3 and a correction amount determiner 4. The evaluation value generator 3 or the correction amount determiner 4 may be integrated with at least one of a first detection element 1 or a second detection element 2. FIG. 1 illustrates configuration of the signal processing device 10 in a case of one set of the first detection element 1 and one set of the second detection element 2. FIG. 2 illustrates configuration of a signal processing device in a case of one set of the first detection element 1 and two sets of the second detection element 2. Of course, three or more sets of the second detection element 2 may be included. In a case of multiple second detection elements 2, the multiple second detection elements 2 preferably detect, from a sheet-like detection target, pieces of characteristic data having mutually different characteristics. The sheet-like detection target is conveyed relatively in a conveyance direction that is a sub-scanning direction, so that each of the first detection element 1 and the second detection element 2 detects a corresponding characteristic. The first detection element 1 and the second detection element 2 are preferably line sensors extending in a main-scanning direction. The main-scanning direction intersects the conveyance direction and, for example, is orthogonal to the conveyance direction. Accordingly, the conveyance direction may be said to be the sub-scanning direction, as described above. In the drawings, the same reference sign is assigned to the same or equivalent components, and detailed description of such components is omitted.

In FIGS. 1 and 2, the first detection element 1 is an element that detects first characteristic data from the sheet-like detection target, and the second detection element 2 is an element that detects, from the sheet-like detection target, second characteristic data having (i) a characteristic that is different from a characteristic of the first characteristic data and (ii) a correlation with the first characteristic data. The sheet-like detection target is a document such as a banknote and a securities certificate and may be said to be a reading target. The characteristic is a physical quantity used in optics, electromagnetics, or the like that is obtainable from the detection target by a sensor. The signal processing device 10 uses the first characteristic data detected by the first detection element 1 and the second characteristic data detected by the second detection element 2 and having (i) a characteristic that is different from a characteristic of the first characteristic data and (ii) a correlation with the first characteristic data.

In FIGS. 1 and 2, the evaluation value generator 3 is a component that generates, evaluation values that are a gain value A and a gain value B or are a gain value A, a gain value B, and a gain value C and that determine whether the first characteristic data includes an unnecessary portion using the correlation of the first characteristic data with the second characteristic data. Although explanation of using gain correction amounts as the evaluation values is described below and the expression "gain value" is used not only in the description but also in the drawings, the evaluation value is not limited to the gain correction amount. The correction amount determiner 4 is a component that determines, by using the evaluation values, for correction of data determined by the evaluation value generator 3 to be the unnecessary portion, a correction amount for the first characteristic data. The signal processing device 10 that is the signal processing device according to Embodiment 1 may suitably further include a data calculator 5. The data calculator 5 is a component that performs calculation for eliminating the unnecessary portion from the first characteristic data by using the correction amount determined by the correction amount determiner 4. Although calculation for eliminating the unnecessary portion from the first characteristic data by using at least one of gain correction or offset correction is conceivable for the calculation performed by the data calculator 5, such calculation is not limiting.

In FIGS. 1 and 2, a sub-scanning start position detector 6 is a component that detects a sub-scanning start position for the first characteristic data, and may perform detection from the first characteristic data as illustrated in FIGS. 1 and 2 or may detect the sub-scanning start position for the first characteristic data from a conveyance position of the sheet-like detection target conveyed relative to the first detection element 1. The sub-scanning start position is a position of the sheet-like detection target to be conveyed that corresponds to beginning of sub-scanning, that is, beginning in the sub-scanning direction. The sub-scanning start position detector 6 is included in order to detect the beginning of sub-scanning of the reading target for correction of signal gains. The evaluation value generator 3 includes a sub-scanning start position aligner 7.

In FIGS. 1 and 2, the sub-scanning start position aligner 7 is a component that, in a case of multiple pieces of the second characteristic data, performs adjustment between the multiple pieces of second characteristic data and additionally, since aligning the first characteristic data and the second characteristic data is necessary, adjusts, by cooperation with the sub-scanning start position detector 6, the second characteristic data or the multiple pieces of second characteristic data so as to be aligned with the first characteristic data. In a case in which relative value of a deviation amount due to conveying of the reading target by a conveyance device does not change greatly, that is, is nearly fixed, the sub-scanning start position aligner 7 may perform the adjustment by using a fixed parameter. The sub-scanning start position detector 6 and the sub-scanning start position aligner 7 may operate following, or prior to, generation of the evaluation values. That is, the orderings in the drawings are merely examples. Further, the evaluation value generator 3 may, before the determination of whether the unnecessary portion is present, perform processing for matching resolution between pieces of data that have a correlation. In the case in which resolutions in the main-scanning direction and the sub-scanning direction are different between the first detection element 1 and the second detection element 2, adjustment of the data sample count is performed in conformance to either resolution.

In particular, the signal processing device 10 of FIG. 2 is a device that uses the first characteristic data detected from the detection target by the first detection element 1 and multiple pieces of other characteristic data that are multiple pieces of the second characteristic data and that each are detected from the detection target by a corresponding detection element of multiple other detection elements that are multiple second detection elements 2 and have (i) a characteristic that is different from the characteristic of the first characteristic data and (ii) a correlation with the first characteristic data. The correction amount determiner 4 is, similarly to FIG. 1, a component that determines, by using the evaluation values, for correction of data determined by the evaluation value generator 3 to be the unnecessary portion, a correction amount for the first characteristic data. On the other hand, the evaluation value generator 3 can be said to be a component that generates, by using the correlation with the pieces of the other characteristic data, the evaluation values determining whether the first characteristic data includes the unnecessary portion. As described above, the multiple pieces of the other characteristic data that are the multiple pieces of the second characteristic data and that are detected by the multiple other detection elements that are the multiple second detection elements 2 preferably have mutually different characteristics. In this preferable case, the evaluation value generator 3 can be said to be a component that determines whether the first characteristic data includes the unnecessary portion by using the multiple pieces of the other characteristic data that are the multiple pieces of the second characteristic data and have mutually different characteristics. The evaluation value generator 3 may perform only generation of the evaluation values and the correction amount determiner 4 may make the determination of the unnecessary portion. In this case, the correction amount determiner 4 can be said to have a part of the functionality of the evaluation value generator 3.

Further, in the case in which the multiple pieces of the other characteristic data that are the multiple pieces of the second characteristic data and that are detected by the multiple other detection elements that are the multiple second detection elements 2 have mutually different characteristics, the following can be said. The evaluation value generator 3 generates the evaluation value for each of the multiple pieces of the other characteristic data that are the multiple pieces of the second characteristic data, and the correction amount determiner 4 can determine the correction amount for the first characteristic data by using, among the evaluation values for the multiple pieces of the other characteristic data that are the multiple pieces of the second characteristic data, at least one evaluation value included in the evaluation values for the pieces of the other characteristic data that are the multiple pieces of the second characteristic data. Further, the correction amount determiner 4 may determine the correction amount for the first characteristic data by using, among the evaluation values for the multiple pieces of the other characteristic data that are the multiple pieces of the second characteristic data, at least one evaluation value included in the evaluation values that is obtained by removing an evaluation value a corresponding one piece of the other characteristic data, that is, one piece of the second characteristic data that contains data having a low correlation with the first characteristic data.

Further, at least one of the evaluation value generator 3 or the correction amount determiner 4 may generate an evaluation value by synthesizing the evaluation values for the multiple pieces of the other characteristic data that are the multiple pieces of the second characteristic data, and the correction amount determiner 4 may determine the correction amount for the first characteristic data by using the evaluation value obtained by synthesizing the evaluation values for the multiple pieces of the other characteristic data that are the multiple pieces of the second characteristic data. The evaluation value generator 3 may generate the evaluation value for each of the multiple pieces of the other characteristic data that are the multiple pieces of the second characteristic data, and the correction amount determiner 4 may determine the correction amount for the first characteristic data by synthesizing the evaluation values for the multiple pieces of the other characteristic data that are the multiple pieces of the second characteristic data. The synthesis of the evaluation values for the multiple pieces of the other characteristic data that are the multiple pieces of the second characteristic data that is performed by the evaluation value generator 3 or the correction amount determiner 4 may be performed by using two or more evaluation values, and using all of the evaluation values for the second characteristic data is unnecessary. For example, the processing executed by the evaluation value generator 3 or the correction amount determiner 4 may conceivably exclude from the synthesis, among the evaluation values for the multiple pieces of the other characteristic data that are the multiple pieces of the second characteristic data, an evaluation value having a low correlation with the first characteristic data.

The signal processing device 10 that is the signal processing device according to Embodiment 1 is effective in a case in which the first characteristic data obtained from the detection target includes the unnecessary portion due to a level of performance of the first detection element 1 that acquires the first characteristic data. The second characteristic data of the detection target that has the correlation with the first characteristic data of the detection target is different from the first characteristic data itself, and thus the second characteristic data, as it is, unusable as a substitute for the first characteristic data. However, due to the correlation with the first characteristic data, in a case in which the first characteristic data detected by the first detection element 1 includes a portion that is not true first characteristic data, the portion that is not the true first characteristic data can be specified as the unnecessary portion from the second characteristic data. Eliminating the unnecessary portion from the first characteristic data enables obtaining the true first characteristic data. The first characteristic data and the second characteristic data may be said to have a correlation even in a case in which the unnecessary portion to be specified for obtaining the true first characteristic data is undetectable, or is hard to detect, as the unnecessary portion in the second characteristic data. This is because, when, for example, due to a difference in characteristic between the first detection element 1 and the second detection element 2, the second characteristic data shows output distribution at a portion corresponding to a portion in the first characteristic data at which the first characteristic data is not expected to show output distribution if the first characteristic data is the true first characteristic data, the following can be said: that is, a portion in the second characteristic data that corresponds to a portion of the detection target and at which the second characteristic data shows detection by output distribution can be said, if the first characteristic data also shows detection by output distribution at a portion corresponding to the portion of the detection target, not to be the true first characteristic data but to be the unnecessary portion included in the first characteristic data. Therefore, the first characteristic data and the second characteristic data may be said to have a correlation even in a case in which the unnecessary portion to be specified for obtaining the true first characteristic data is undetectable, or is hard to detect, as the unnecessary portion in the second characteristic data.

Embodiment 2

Hereinafter, a signal processing device 10 that is a signal processing device according to Embodiment 2 is described with reference to FIGS. 3, 4 and 5. In Embodiment 2, a specific case is described in which the first detection element 1 is a capacitance detector 1 that is a detector for detecting a change in capacitance. The capacitance detector 1 may be a thickness detection sensor that detects a thickness of the detection target. Examples of the thickness detection sensor include, in addition to the capacitance detector 1, an ultrasonic detector, an optical sensor, a roller, or the like. On the other hand, the second detection element 2 is any one of: a magnetic image detector 2 that is an element for detecting a magnetic image from the detection target, that is, is a magnetic image reading element; an image detector 2 that is an element for detecting an image from the detection target, that is, is an image reading element; a front-surface reflection image detector 2 that is an element for detecting a reflected-light image from a front surface that is one surface of the detection target, that is, is an image reading element; a back-surface reflection image detector 2 that is an element for detecting a reflected-light image from a back surface that is the other surface of the detection target, that is, is an image reading element; or a transmission image detector 2 that is an element for detecting a transmitted-light image from the detection target, that is, is an image reading element. Basic operations of the evaluation value generator 3, the correction amount determiner 4, and the data calculator 5 in Embodiment 2 are similar to those of Embodiment 1. This also applies to the sub-scanning start position detector 6 and the sub-scanning start position aligner 7.

Figure 3:
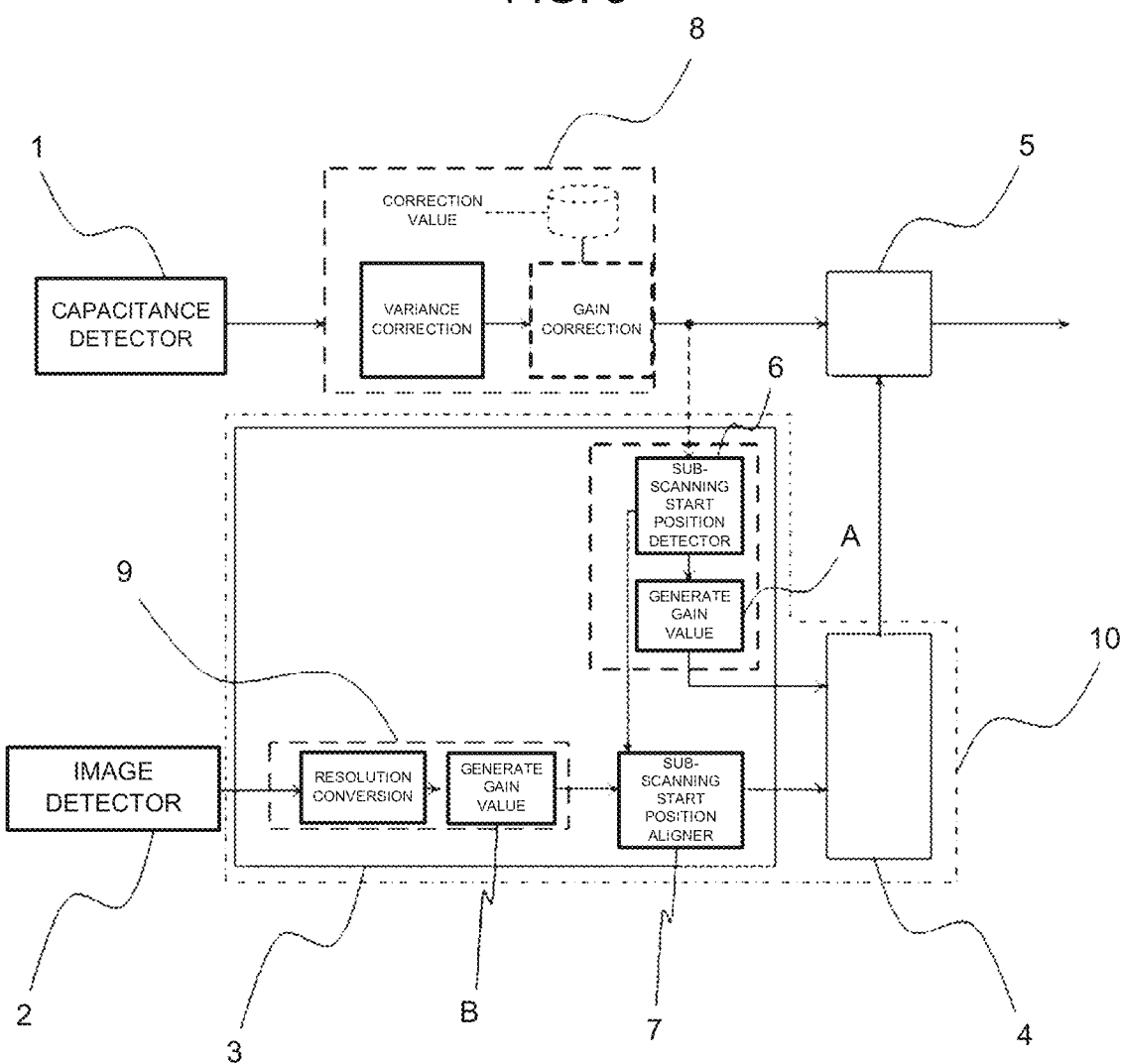
FIG. 3 is a functional block diagram of a signal processing device according to Embodiment 2.

FIG. 3 illustrates a signal processing device in a case of one set of the first detection element 1, that is, one capacitance detector 1, and one set of the second detection element 2, that is, one image detector 2. FIG. 4 illustrates a signal processing device in a case of one set of the first detection element 1, that is, one capacitance detector 1, and two sets of the second detection element 2, that is, one magnetic image detector 2 and one image detector 2. Of course, three or more sets of the second detection element 2 may be included, as illustrated in FIG. 5. FIG. 5 illustrates a signal processing device in a case of one set of the first detection element 1, that is, one capacitance detector 1, and four sets of the second detection element 2, that is, one magnetic image detector 2, one front-surface reflection image detector 2, one back-surface reflection image detector 2 and one transmission image detector 2.

Also in Embodiment 2, the multiple second detection elements 2 preferably detect, from the sheet-like detection target, pieces of characteristic data having mutually different characteristics. The sheet-like detection target is conveyed relatively in the conveyance direction that is the sub-scanning direction, so that each of the first detection element 1 and the second detection element 2 detects a corresponding characteristic. The first detection element 1 and the second detection element 2 are preferably line sensors extending in the main-scanning direction. In the drawings, the same reference sign is assigned to the same or equivalent components, and detailed description of such components is omitted.

Due to the aforementioned configuration, the signal processing device 10 that is the signal processing device according to Embodiment 2 may be said to be a device including the evaluation value generator 3 that uses a correlation with data that has, as a characteristic different from a characteristic of the first characteristic data, any one characteristic of a reflected-light image due to visible light from the detection target, a reflected-light image due to invisible light from the detection target, a transmitted-light image due to visible light, a transmitted-light image due to invisible light, or a magnetic image.

Figure 4:
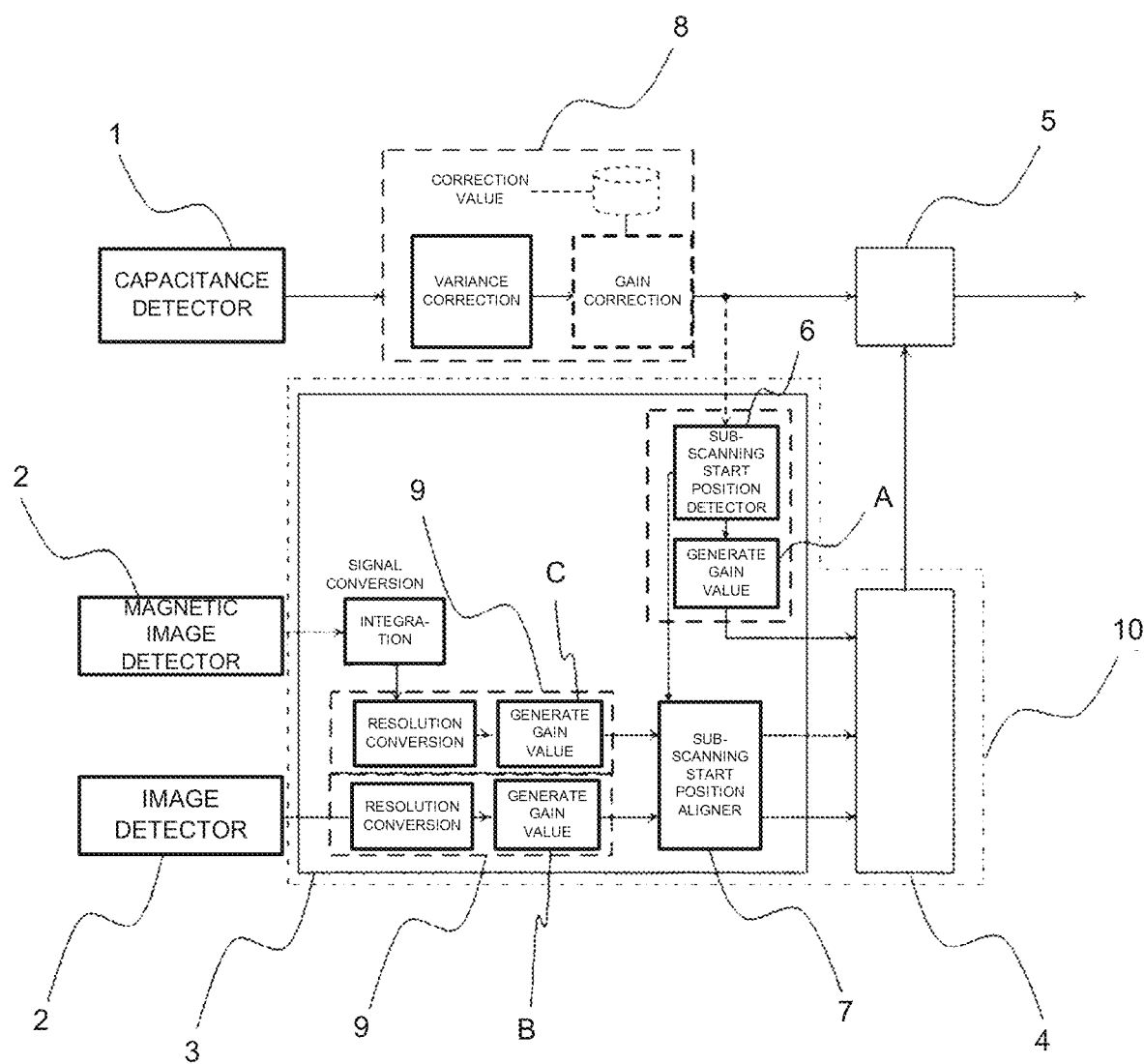
FIG. 4 is a functional block diagram of another signal processing device according to Embodiment 2.
Figure 5:
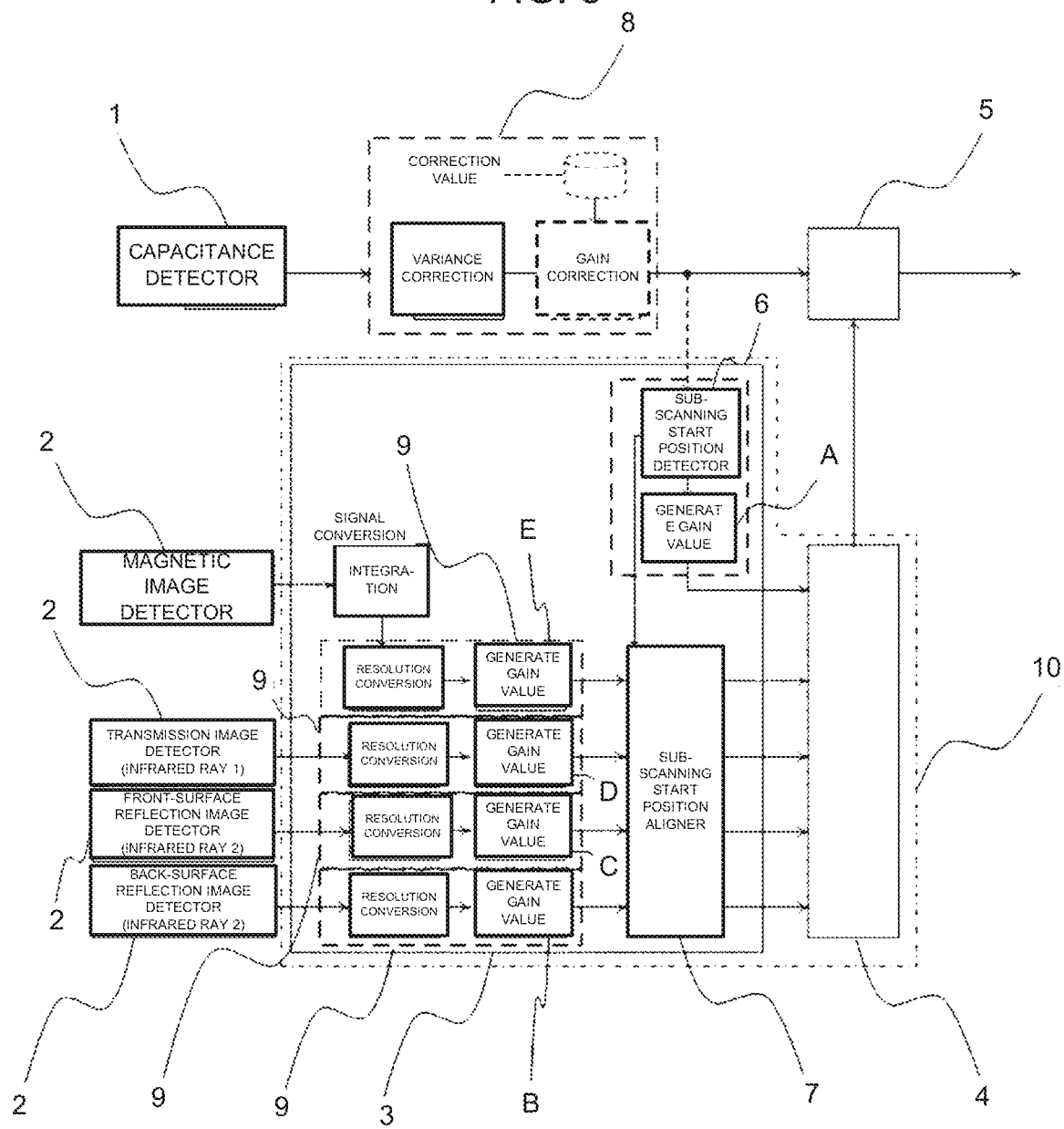
FIG. 5 is a functional block diagram of still another signal processing device according to Embodiment 2.

In FIGS. 3, 4 and 5, a first pre-processor 8 is a component that performs, as pre-processes, corrections with respect to the first characteristic data detected by the first detection element 1. Each of the pre-processes is described in the block diagrams. This is one example configuration, and employing another configuration is conceivable. Each of the pre-processes is processing for absorbing variance between elements in signals detected thereby. A second pre-processor 9 is a component that is included in, or is external to, the evaluation value generator 3 and that performs, as pre-processes, corrections with respect to the second characteristic data detected by the second detection element 2. Each of the pre-processes is described in the block diagrams. As well as the first pre-processor 8, this is one example configuration, and employing another configuration is conceivable. Each of the pre-processes is processing for absorbing variance between elements in signals detected thereby. Although Embodiment 1 describes performing by the evaluation value generator 3 processing for matching resolution between pieces of data that have a correlation before making determination of whether the unnecessary portion is present, in Embodiment 2, the second pre-processor 9 performs the processing for matching resolution between pieces of data that have a correlation before a determination of whether the unnecessary portion is present is made. In the case in which resolution in the main-scanning direction and the sub-scanning direction is different between the first detection element 1 and the second detection element 2, adjustment of the data sample count is performed in conformance to either resolution.

The signal processing device 10 illustrated in FIG. 3 is a device that uses the first characteristic data detected from the sheet-like detection target by the elements for detecting a change in capacitance and the second characteristic data detected from the sheet-like detection target by image reading elements and having a correlation with the first characteristic data. Specifically, the signal processing device 10 includes (i) the evaluation value generator 3 that generates, by using the correlation with the second characteristic data, the evaluation values determining whether the first characteristic data includes the unnecessary portion and (ii) the correction amount determiner 4 that determines, by using the evaluation values, for correction of data determined by the evaluation value generator 3 to be the unnecessary portion, a correction amount for the first characteristic data. The signal processing device 10 illustrated in FIG. 3 may be said to be a device in the case in which the first detection element 1 of the signal processing device 10 illustrated in FIG. 1 is the capacitance detector 1 and the second detection element 2 of the signal processing device 10 illustrated in FIG. 1 is the image detector 2.

The signal processing device 10 illustrated in FIG. 4 is an example device in the case in which the signal processing device 10 illustrated in FIG. 3 includes two sets of the second detection element 2, by including the magnetic image detector 2 in addition to the image detector 2. Although FIG. 4 illustrates integrating output from the magnetic image detector 2 and sending the integrated output to the second pre-processor 9, such configuration is based on the assumption of employing a magnetic line sensor for which integration is required, and thus such configuration is not necessarily required. Accordingly, signal conversion may be performed when necessary, and the integration processing is merely an example. The signal processing device 10 illustrated in FIG. 4 may be said to be a device in the case in which the first detection element 1 of the signal processing device 10 illustrated in FIG. 2 is the capacitance detector 1 and the second detection elements 2 of the signal processing device 10 illustrated in FIG. 2 are the magnetic image detector 2 and the image detector 2. The image detector 2 is any one of the transmission image detector 2, the front-surface reflection image detector 2, and the back-surface reflection image detector 2. A light source used for reading may have the wavelength of an infrared ray 1, or may have those of visible light, ultraviolet rays, other infrared rays, or the like.

The signal processing device 10 illustrated in FIG. 5 is an example device in the case in which the signal processing device 10 illustrated in FIG. 3 includes four sets of the second detection element 2, by including the magnetic image detector 2, the transmission image detector 2, the front-surface reflection image detector 2, and the back-surface reflection image detector 2. Although integrating output from the magnetic image detector 2 and sending the integrated output to the second pre-processor 9 are illustrated similarly to the signal processing device 10 illustrated in FIG. 4, this configuration is illustrated based on the assumption of employing a magnetic line sensor for which integration is required, and thus such configuration is not necessarily required. The transmission image detector 2 is a component that receives transmitted light that is obtained by radiating an infrared ray, which is the infrared ray 1, onto the detection target from the light source used for the reading and that is the infrared ray 1 that transmits the detection target. The light source used for the reading may have the wavelength of the infrared ray 1, or may have that of other light, such as visible light and ultraviolet rays.

In FIG. 5, the front-surface reflection image detector 2 is a component that receives reflected light that is obtained by radiating an infrared ray, which is an infrared ray 2 and has a wavelength different from the wavelength of the infrared ray 1, onto the one surface that is the front surface of the detection target from the light source used for the reading and that is the infrared ray 2 that is reflected by the one surface of the detection target. The back-surface reflection image detector 2 is a component that receives reflected light that is obtained by radiating an infrared ray, which is the infrared ray 2 and has the wavelength different from the wavelength of the infrared ray 1 onto the other surface that is the back surface of the detection target from the light source used for the reading and that is the infrared ray 2 that is reflected by the other surface of the detection target. The infrared ray used by the transmission image detector 2 for the reading, that is, the infrared ray 1, may be radiated onto either one of the one surface or the other surface of the detection target. Two sets of the transmission image detector 2 may be arranged in order to read transmitted light from both the one surface and the other surface of the detection target. The light source used for the reading is not limited to that of the infrared ray 2, and may be that of other light, such as visible light and ultraviolet rays.

Also in the signal processing device 10 that is the signal processing device according to Embodiment 2, the first characteristic data and the second characteristic data may be said to have a correlation even in a case in which a portion detected in the true first characteristic data is undetectable, or is hard to detect, as the unnecessary portion in the second characteristic data. This point is explained below by using, as an example, a case in which the signal processing device 10 receives input, the first detection element is the capacitance detector 1, and the second detection element is the transmission image detector 2. Hereinafter, an example case is considered that is directed to, by the capacitance detector 1, as the first characteristic data, detecting cellophane tape adhering to the sheet-like detection target, more strictly, detecting a change in capacitance at a portion that is different from other portions in capacitance due to the cellophane tape.

At portions of the detection target outside of the cellophane tape, changes in capacitance that are detected by the capacitance detector 1 and correspond to the first characteristic data and a transmission image of the detection target that is detected by the transmission image detector 2 and corresponds to the second characteristic data have a correlation, and thus by utilizing this correlation, the signal processing device 10 can determine, in a case in which the second characteristic data shows output distribution at a portion in the second characteristic data and the first characteristic data also shows output distribution at a portion corresponding to the portion in the second characteristic data, the portion not to be the true first characteristic data, that is, not to be a change in capacitance at a portion that is different from other portions in capacitance due to the cellophane tape, but to be the unnecessary portion included in the first characteristic data detected by the capacitance detector 1. Therefore, the first characteristic data and the second characteristic data can be said to have a correlation even in a case in which the unnecessary portion to be specified for obtaining the true first characteristic data is undetectable, or is hard to detect, as the unnecessary portion in the second characteristic data.

In the aforementioned case, that is, in the case in which (i) the first detection element 1 is the capacitance detector 1 and the second detection element 2 is the transmission image detector 2 and (ii) detection is desired for cellophane tape adhering to the detection target, more strictly, for a change in capacitance at a portion that is different from other portions in capacitance due to the cellophane tape, use is conceivable of linear change with respect to a medium position in illumination depth characteristic of the transmission image that is obtained by the transmission image detector 2 and is a result of output from a transmission light source. Moreover, variable thresholding is conceivable by estimating the medium position of the detection target from the output level of the transmission light source and setting a threshold for binarization of output from the capacitance detector 1.

REFERENCE SIGNS LIST

1 First detection element (Capacitance detector)
2 Second detection element (Magnetic image detector, Image detector, Front-surface reflection image detector, Back-surface reflection image detector, Transmission image detector)

3 Evaluation value generator
4 Correction amount determiner
5 Data calculator
6 Sub-scanning start position detector
7 Sub-scanning start position aligner
8 First pre-processor
9 Second pre-processor
10 Signal processing device

The invention claimed is:

1. A signal processing device configured to use first characteristic data and second characteristic data, the first characteristic data being detected from a sheet-like detection target by a first detection element, the second characteristic data being detected from the detection target by a second detection element and having (i) a characteristic that is different from a characteristic of the first characteristic data and (ii) a correlation with the first characteristic data, the signal processing device comprising:
   an evaluation value generator to generate an evaluation value determining whether an unnecessary portion is present using the correlation of the first characteristic data with the second characteristic data, the unnecessary portion being included in the first characteristic data and being detected by the first detection element; and
   a correction amount determiner to determine, using the evaluation value, a correction amount for the first characteristic data to correct the data determined to be the unnecessary portion by the evaluation value generator.

2. The signal processing device according to claim 1, wherein processing for matching resolution between pieces of data that have a correlation is performed before the determination of whether the unnecessary portion is present.

3. The signal processing device according to claim 1, wherein the pieces of data that have the correlation is acquired by line sensors aligned in a sub-scanning direction.

4. The signal processing device according to claim 1, wherein the first detection element detects a change in capacitance.

5. The signal processing device according to claim 1, wherein the evaluation value generator uses a correlation with data that has, as a characteristic different from a characteristic of the first characteristic data, any one characteristic of a reflected-light image due to visible light from the detection target, a reflected-light image due to invisible light from the detection target, a transmitted-light image due to visible light, a transmitted-light image due to invisible light, or a magnetic image.

6. The signal processing device according to claim 1, further comprising:
   a data calculator, wherein
   the data calculator performs calculation for eliminating the unnecessary portion from the first characteristic data by using the correction amount determined by the correction amount determiner.

7. The signal processing device according to claim 6, wherein the data calculator performs the calculation for eliminating the unnecessary portion from the first characteristic data by employing at least one of gain correction or offset correction.

8. A signal processing device configured to use first characteristic data and pieces of another characteristic data, the first characteristic data being detected from a sheet-like detection target by a first detection element, the pieces of the another characteristic data respectively being detected from the detection target by other detection elements, each of the pieces of the another characteristic data being detected from the detection target by a corresponding other detection element included in the other detection elements and having (i) a characteristic that is different from a characteristic of the first characteristic data and (ii) a correlation with the first characteristic data, the signal processing device comprising:
   an evaluation value generator to generate an evaluation value determining whether an unnecessary portion is present using the correlations of the first characteristic data with the pieces of the another characteristic data, the unnecessary portion being included in the first characteristic data and being detected by the first detection element; and
   a correction amount determiner to determine, using the evaluation value, a correction amount for the first characteristic data to correct the data determined to be the unnecessary portion by the evaluation value generator.

9. The signal processing device according to claim 8, wherein
   the pieces of the another characteristic data have mutually different characteristics, and
   the evaluation value generator determines whether the unnecessary portion is present by using the pieces of the another characteristic data that have the mutually different characteristics.

10. The signal processing device according to claim 8, wherein
   the evaluation value generator generates a plurality of the evaluation values, each of the plurality of the evaluation values being generated for a corresponding one of the pieces of the another characteristic data, and
   the correction amount determiner determines the correction amount for the first characteristic data by using, among the plurality of evaluation values for the pieces of the another characteristic data, at least one evaluation value included in the plurality of evaluation values.

11. The signal processing device according to claim 10, wherein the correction amount determiner determines the correction amount for the first characteristic data by using, among the plurality of evaluation values for the pieces of the another characteristic data, at least one evaluation value included in the plurality of evaluation values, the at least one evaluation value being obtained by removing an evaluation value for a corresponding one of the pieces of the another characteristic data, the piece of another characteristic data containing data having a low correlation with the first characteristic data.

12. The signal processing device according to claim 8, wherein
   the evaluation value generator generates the evaluation value by synthesizing at least two of a plurality of the evaluation values for the pieces of the another characteristic data, and
   the correction amount determiner determines the correction amount for the first characteristic data by using the evaluation value obtained by the synthesizing.

13. The signal processing device according to claim 8, wherein
   the evaluation value generator generates a plurality of the evaluation values for the pieces of the another characteristic data, each of the plurality of evaluation values being generated for a corresponding one of the pieces of the another characteristic data, and
   the correction amount determiner synthesizes at least two of the plurality of evaluation values for the pieces of the another characteristic data and determines the correction amount for the first characteristic data by using an evaluation value obtained by the synthesizing.

14. A signal processing device configured to use first characteristic data and second characteristic data, the first characteristic data being detected from a sheet-like detection target by an element for detecting a change in capacitance, the second characteristic data being detected from the detection target by an image reading element and having a correlation with the first characteristic data, the signal processing device comprising:

an evaluation value generator to generate an evaluation value determining whether an unnecessary portion is present using the correlation of the first characteristic data with the second characteristic data, the unnecessary portion being included in the first characteristic data and being detected by the first detection element; and a correction amount determiner to determine, using the evaluation value, a correction amount for the first characteristic data to correct the data determined to be the unnecessary portion by the evaluation value generator.

15. The signal processing device according to claim 14, wherein the image reading element is an element for detecting a transmitted-light image from the detection target.

* * * * *